(12) United States Patent
Iwamoto

(10) Patent No.: US 6,169,643 B1
(45) Date of Patent: Jan. 2, 2001

(54) DISK DRIVE SUSPENSION WITH HYBRID FLEXIBLE CIRCUIT LEADS

(75) Inventor: Alejandro Koji Iwamoto, Temecula, CA (US)

(73) Assignee: Magnecomp Corp., Temecula, CA (US)

( * ) Notice: Under 35 U.S.C. 154(b), the term of this patent shall be extended for 0 days.

(21) Appl. No.: 09/304,242

(22) Filed: May 3, 1999

Related U.S. Application Data

(63) Continuation-in-part of application No. 08/897,660, filed on Jul. 21, 1997, now Pat. No. 5,901,016.

(51) Int. Cl.[7] ........................................... G11B 5/48
(52) U.S. Cl. ............................................ 360/245.9
(58) Field of Search ............................ 360/245.8, 245.9, 360/246

(56) References Cited

U.S. PATENT DOCUMENTS

| 5,812,344 | * | 9/1998 | Balakrishnan | 360/104 |
| 5,883,758 | * | 3/1999 | Bennin et al. | 360/104 |
| 5,903,413 | * | 5/1999 | Brooks, Jr. et al. | 360/106 |
| 5,986,853 | * | 11/1999 | Simmons et al. | 360/104 |
| 6,046,886 | * | 4/2000 | Himes et al. | 360/104 |
| 6,057,986 | * | 5/2000 | Takasugi | 360/104 |

* cited by examiner

Primary Examiner—Jefferson Evans
(74) Attorney, Agent, or Firm—Louis J. Bachand

(57) ABSTRACT

A lower cost metal layer free flexible conductive laminate segment is connected to a relatively smaller amount of the more expensive metal layer containing flexible conductive laminate segment to connect a slider to signal circuitry in a cost efficient way while avoiding biasing of the slider movement by the conductor.

9 Claims, 3 Drawing Sheets

DISK DRIVE SUSPENSION WITH HYBRID FLEXIBLE CIRCUIT LEADS

REFERENCE TO RELATED APPLICATION

This application is a continuation in part of my copending application Ser. No. 08/897,660 filed Jul. 21, 1997, now U.S. Pat. No. 5,901,016 issued May 4, 1999.

BACKGROUND OF THE INVENTION

1. Field of the Invention

This invention has to do with disk drive suspensions, and more particularly with improvements in the design and structure of disk drive suspension electrical connectors that are used to carry current between a load beam-supported slider and suspension-associated signal circuitry. In a specific aspect, the invention provides a disk drive suspension in which the advantages of flexible conductive laminate segments, including lower cost and easier fabrication, are maximally obtained while having the benefits of a metal layer containing flexible conductive laminate segment from the load beam rigid portion forward.

2. Related Art

Signal circuitry has been electrically connected to the slider, including the recording head carried by the slider, by various conductors including wire bundles and flexible circuitry with varying effectiveness and cost efficiencies.

SUMMARY OF THE INVENTION

It is accordingly an object of the invention to provide a disk drive suspension having electrical connections which provide substantially the benefits of a flexible circuit connection at lower cost and with easier fabrication, and while eliminating a junction at the proximate end of the suspension. It is another object to provide an improved suspension in which the manufacturing advantages of flexible circuit, including ready automation of slider-to-flexure assembly and substantially bias-free attachment to the slider are also realized. It is a further object to provide a suspension having a novel hybrid connector of metal layer free flexible circuit conductor and a wire layer including flexible circuit conductor, maximizing the advantages of each and minimizing the disadvantages of each in the resultant disk drive suspension.

These and other objects of the invention to become apparent hereinafter are realized in a disk drive suspension comprising a load beam having a distal rigid portion, and supported by the load beam a flexure carrying a slider head, an electrical connector running substantially the length of the load beam to the slider, the connector comprising an electrically integrated hybrid of different segments including a first flexible conductive laminate segment free of a metal support layer that is connected to signal circuitry and a second flexible conductive laminate segment including a metal support layer connected to the slider, the segments being arranged sequentially and in such manner that the slider head is electrically coupled by the first flexible conductive laminate segment at the proximal end of the load beam, and by the second flexible conductor at the load beam distal rigid portion.

In this and like embodiments, typically, the first flexible conductive laminate segment comprises at least one pair of conductive leads laminated with plastic dielectric, the first flexible conductive laminate segment is free of junctions between the signal circuitry and the second flexible conductive laminate segment, the second flexible conductive laminate segment is electrically connected to the slider substantially in slider movement bias free relation, and the first flexible conductive laminate segment constitutes the entire length of the electrical connector up to the load beam distal rigid portion.

In a further embodiment, the invention provides a disk drive suspension comprising a load beam having a distal rigid portion, and supported by the load beam a flexure carrying a slider head, an electrical connector carried by the load beam along a major portion of the connector length, the connector comprising a two-component structure of separate, physically different conductors including a first flexible conductive laminate segment consisting of copper conductors and plastic dielectric and a second flexible conductive laminate segment comprising copper conductors, plastic dielectric, and a stainless steel support laminated to the plastic dielectric, the conductors being joined at the proximate end of the load beam distal rigid portion to define an continuous electrical path for carrying current from the slider head to signal circuitry beyond the load beam.

In this and like embodiments, typically, the first flexible conductive laminate segment is free of junctions between the device electronics and the second flexible conductive laminate segment, the second flexible conductive laminate segment is electrically connected to the slider substantially in slider movement bias free relation, the first flexible conductive laminate segment constitutes the entire length of the electrical connector up to the load beam distal rigid portion, and the load beam is apertured rearwardly of the second flexible conductive laminate segment, the slider is located on a first surface of the load beam, and the first flexible conductive laminate segment is located on the opposite surface of the load beam, the second flexible conductive laminate segment being connected to the first flexible conductive laminate segment through the load beam aperture.

In a further embodiment, the invention provides in combination on a load beam: the noted first and second flexible conductive laminate segments, electrically coupled into a single electrical connector and arranged to conduct current from a slider to signal circuitry.

BRIEF DESCRIPTION OF THE DRAWINGS

The invention will be further described in conjunction with the attached drawings in which.

DETAILED DESCRIPTION OF THE INVENTION

The present invention suspension utilizes a novel electrical connector in which the major portion of the conductor is a metal layer free flexible conductive laminate and the minor portion is a second flexible conductive laminate conductor segment that includes a metal layer useful for acting as a flexure. The advantages of the invention include a reduction is cost since the flexible circuit without a metal layer is relatively inexpensive in comparison with the metal layer including laminate, used here in small quantities, just along the rigid portion of the load beam, and an absence of conductor bias at the slider/air bearing The invention hybrid electrical connector uses a flexible circuit based flexure with circuit traces on a dielectric plastic and a metal layer support, that is connected to a metal layer free flexible circuit combination of traces and dielectric plastic immediately at the proximate end of the load beam rigid portion. This assembly offers the advantages that the costly metal layer containing flexible circuit can be used less than if it extended all the way to the actuator connection points, a important consideration given the high material cost of the metal layer flexible circuit conductor. Further the proximate first segment is readily handled; the distal second segment of the flexible circuit and flexure when formed as a strip also can be handled with known manufacturing procedures, including placement and welding, and automation is feasible. The product offers substantially the electrical performance of a wire bundle system. Moreover, manufacturing errors and other fabrication costs are typically reduced by having but one junction between the signal electronics at the base of the load beam at the actuator and the junction at the load beam rigid portion where the second segment commences.

Figure 1:
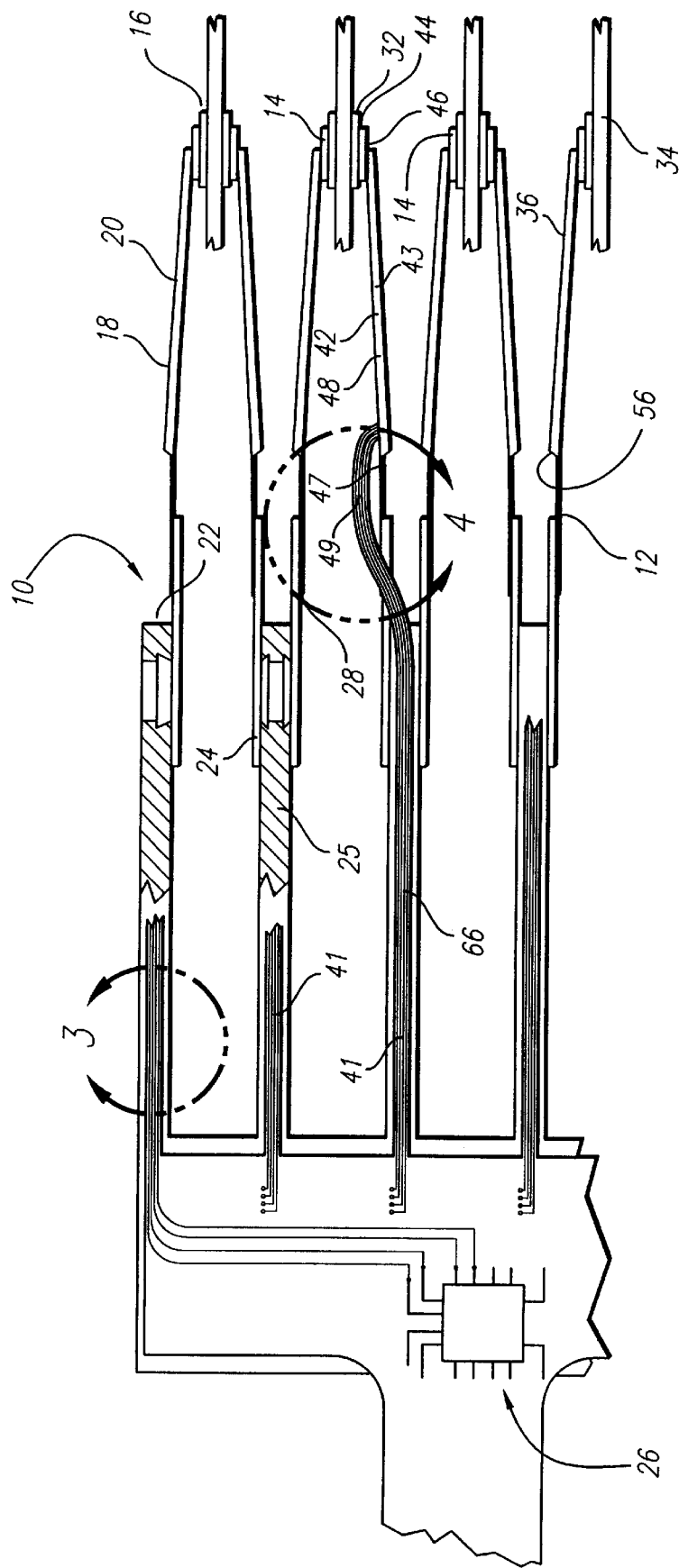
FIG. 1 is a side elevation view, partly schematic, of a head stack assembly of load beams juxtaposed with the flexible conductive laminate segments.
Figure 2:
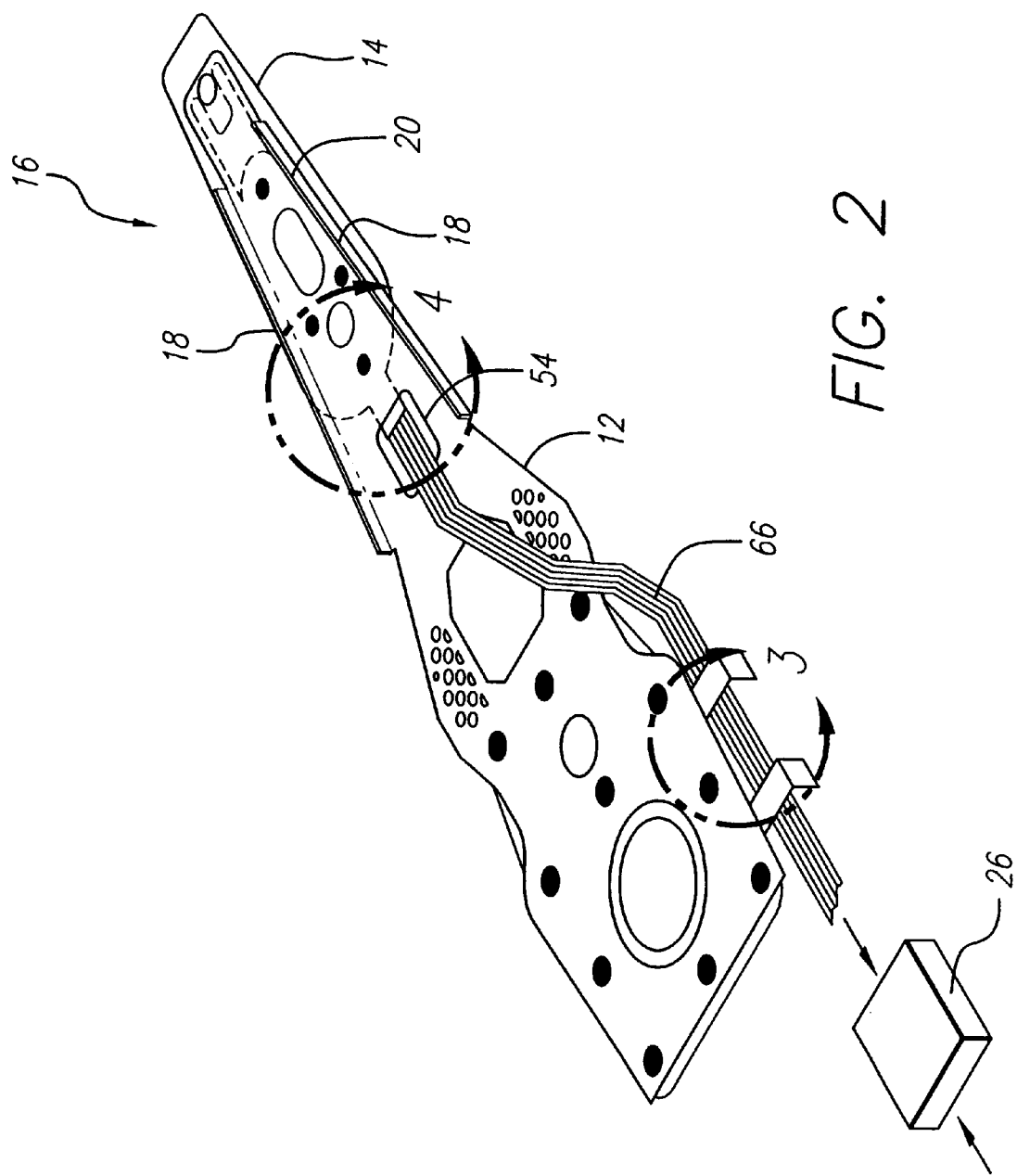
FIG. 2 is an oblique view of the invention suspension.
Figure 3:
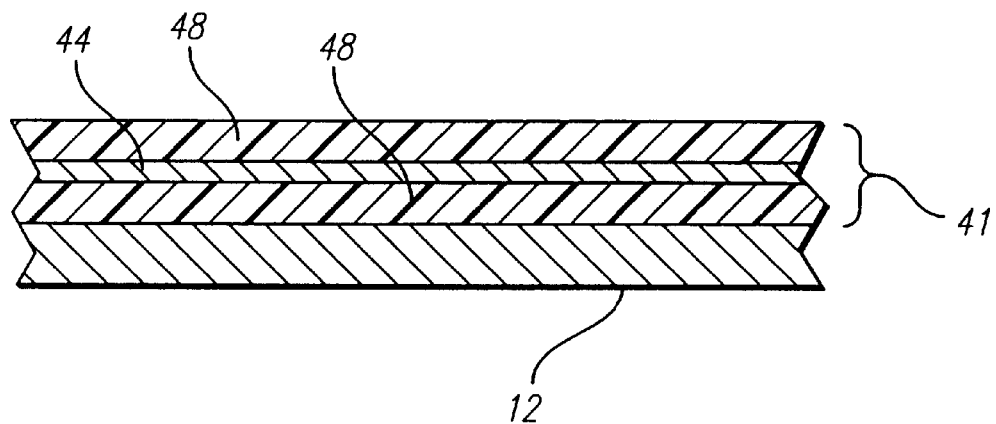
FIG. 3 is a view taken on line 3 in FIG. 1.
Figure 4:
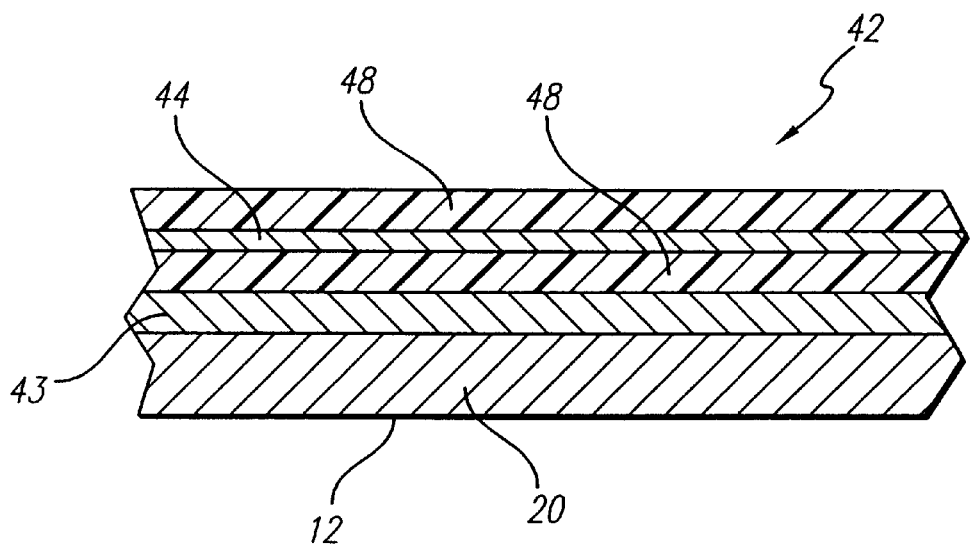
FIG. 4 is a view taken on line 4 in FIG. 1.

With reference now to the drawing in detail, in FIGS. 1–4 the invention disk drive suspension 10 comprises a load beam 12 and a flexure 14 shown as a unit 16. load beam 12 is generally planar and locally flanged to have side rails 18 in its rigid distal portion 20. Load beam base portion 22 attaches to a mounting plate 24 which in turn mounts the load beam 12 to an actuator 25. Signal circuitry element 26 is located at the proximate end 28 of the load beam 12 for the purpose of sensing and transmitting signal exchanges through electrical connector 66 with the slider 32 carried on flexure 14 attached to the load beam distal end 36. Slider 32 defines an air bearing relative to the disk drive disk 34 and carries the electrical and magnetic portions of the head.

The load beam 12, flexure 14, slider 32 and signal circuitry element 26 shown are typical of suitable structures for their respective fluctions, with no particular form or design of load beam, flexure, slider or signal circuitry being critical to this invention.

The invention is concerned particularly with improvements in the design and form of the electrical connector 66 between the signal circuitry 26 and the slider 32. The freedom of movement of the flexure 14, and rotation of the slider 32 in various axes, is critical to the optimum functioning of the suspension 10. It is nonetheless required to attach electrical connectors to the flexure and fine leads to the slider, without unduly affecting the movement freedom of these elements. In the present device, a first segment of the connector 66 comprising a metal layer-free flexible conductive laminate 41 is connected to a second connector segment comprising second flexible conductive laminate 42. Second flexible conductive laminate 42 comprises metal support layer 43, pairs of conductive leads 44, 46, and plastic dielectric film 48; it can function as the flexure 32 and its leads used to electrically couple to the slider 32. The flexible conductive laminate 42 segment is arranged to add no particular bias to flexure 32 movement. The use of flexible conductive laminate 42 as or with the flexure 14 enables automated attachment of the leads 44, 46 to the slider 32 as noted previously and is advantageous in the manufacturing process.

In cases where the connector 66 segment comprised of metal layer-free conductive laminate 41 does not lie on the same side of the load beam as the slider 32, the load beam is apertured at 54 just beyond the proximal end of the load beam rigid portion 20. The leads 44, 46 from the flexible conductive laminate 42 are gathered at the rigid portion proximal end 56 and there are accessible through aperture 54 of the load beam 12 for connection to the distal ends of leads 47, 49 of first flexible conductive laminate 41. The first flexible conductive laminate 41 extends along the load beam 12 length to and through the aperture 54 for connection to the conductive leads 44, 46 of the flexible conductive laminate 42 to form electrical connector 66 running the length of the load beam and electrically interconnecting slider 32 and signal circuitry element 26. The use of a major portion segment, typically at least two-thirds of the connector 66, of the metal layer-less flexible conductive laminate substantially reduces cost as the laminate 41, typically making up only one-third of the connector is considerably less expensive than the metal layer supported laminate 42. In addition, the use of the flexible conductive laminate 41 in accordance with the invention makes the use of junctions other than at the signal circuitry 26 and the junction with flexible conductive laminate 42.

The foregoing objects of the invention are thus met.

I claim:

1. A disk drive suspension comprising a load beam having a distal rigid portion, and supported by said load beam a flexure carrying a slider head, an electrical connector running substantially the length of said load beam to said slider, said connector comprising an electrically integrated hybrid of different segments including a first flexible conductive laminate segment free of a metal support layer that is connected to signal circuitry, said first flexible conductive laminate segment constituting the entire length of said electrical connector up to said load beam distal rigid portion, and a second flexible conductive laminate segment including a metal support layer connected to said slider, said segments being arranged sequentially and in such manner that the slider head is electrically coupled by said first flexible conductive laminate segment at the proximal end of said load beam, and by said second flexible conductor at said load beam distal rigid portion.

2. The disk drive suspension according to claim 1, in which said first flexible conductive laminate segment comprises at least one pair of conductive leads laminated with plastic film.

3. The disk drive suspension according to claim 1, in which said first flexible conductive laminate segment is free of junctions between said signal circuitry and said second flexible conductive laminate segment.

4. The disk drive suspension according to claim 1, in which said second flexible conductive laminate segment is electrically connected to said slider substantially in slider movement bias free relation.

5. A disk drive suspension comprising a load beam having a distal rigid portion, and supported by said load beam a flexure carrying a slider head, an electrical connector carried by said load beam along a major portion of the connector length, said connector comprising a two-component structure of separate, physically different conductors including a first flexible conductive laminate segment consisting of copper conductors and plastic dielectric, said first flexible conductive laminate segment constituting the entire length of said electrical connector up to said load beam distal rigid portion, and a second flexible conductive laminate segment comprising copper conductors, plastic dielectric, and a stainless steel support laminated to said plastic dielectric, said conductors being joined at the proximate end of said load beam distal rigid portion to define an continuous electrical path for carrying current from said slider head to signal circuitry beyond said load beam.

6. The disk drive suspension according to claim 5, in which said first flexible conductive laminate segment is free of junctions between said device electronics and said second flexible conductive laminate segment.

7. The disk drive suspension according to claim 6, in which said second flexible conductive laminate segment is electrically connected to said slider substantially in slider movement bias free relation.

8. In combination on a load beam: the first and second flexible conductive laminate segment according to claim 5, electrically coupled into a single electrical connector and arranged to conduct current from a slider to signal circuitry.

9. A disk drive suspension comprising a load beam having a distal rigid portion, and supported by said load beam a flexure carrying a slider head, an electrical connector carried by said load beam along a major portion of the connector length, said connector comprising a two-component structure of separate, physically different conductors including a first flexible conductive laminate segment consisting of copper conductors and plastic dielectric and a second flexible conductive laminate segment comprising copper conductors, plastic dielectric, and a stainless steel support laminated to said plastic dielectric, said conductors being joined at the proximate end of said load beam distal rigid portion to define an continuous electrical path for carrying current from said slider head to signal circuitry beyond said load beam said load beam being apertured rearwardly of said second flexible conductive laminate segment, said slider being located on a first surface of said load beam, and said first flexible conductive laminate segment being located on the opposite surface of said load beam, said second flexible conductive laminate segment being connected to said first flexible conductive laminate segment through said load beam aperture.

* * * * *